Sept. 11, 1956 M. A. MOSHER ET AL 2,762,767
METHOD AND MEANS FOR THE PREVENTION OF ELECTROLYTIC CORROSION
Filed Feb. 9, 1952
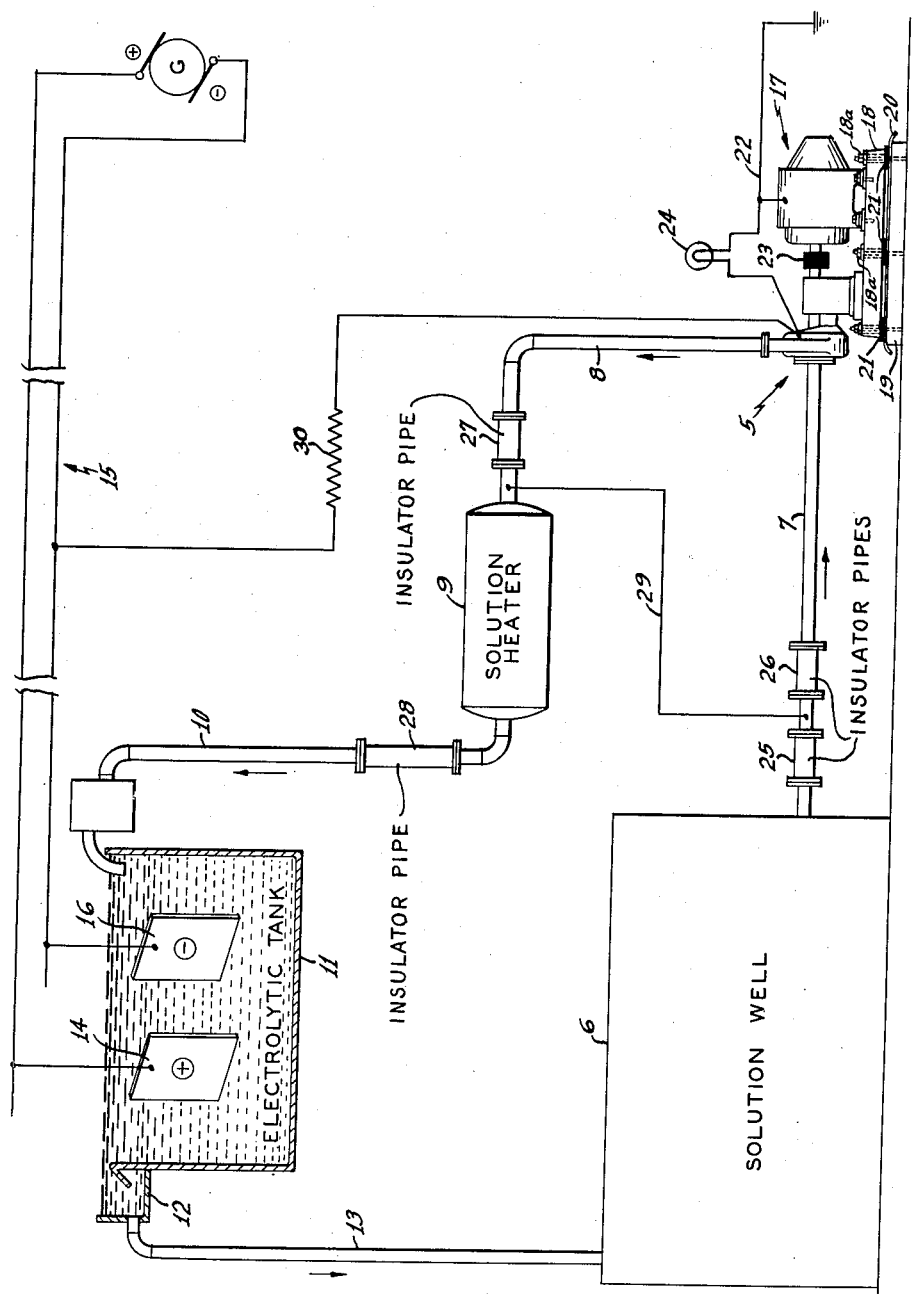
INVENTORS
William C. Noddings
Merrill A. Mosher
BY
Pennie, Edmonds, Morton, Barrows & Taylor
ATTORNEYS

United States Patent Office 2,762,767
Patented Sept. 11, 1956

2,762,767

METHOD AND MEANS FOR THE PREVENTION OF ELECTROLYTIC CORROSION

Merrill A. Mosher, Woodbridge, and William C. Noddings, Matawan, N. J., assignors to International Smelting and Refining Company, a corporation of Montana Application February 9, 1952, Serial No. 270,832

10 Claims. (Cl. 204—147)

This invention relates to a method for preventing electrolytic corrosion of metallic equipment used to handle electrolyte solutions which are connected in a direct current circuit and through which stray electric currents capable of causing rapid electrolytic corrosion of such equipment circulate. Apparatus by which the method of the invention can be carried out is also provided.

Pumps and other equipment for handling electrolyte solutions in various electrolytic operations are often constructed of a stainless steel alloy or other corrosion resistant metal. The metals used are resistant to chemical attack by most acid-containing electrolytes, for example, copper tank house electrolyte which typically contains some 15% sulfuric acid and is maintained at a temperature of around 140° F. However, these metals usually are subject to rapid electrolytic corrosion whenever they become anodic to the electrolyte. If the anodic condition endures for any prolonged period of time, the metal is extensively dissolved, necessitating major repairs or greatly shortening the service life of the pump or other equipment. Stray currents flowing through the electrolyte circulation system from the electrolytic tank circuits frequently cause the metal of the circulation pumps to become anodic with regard to the electrolyte solution being circulated. Although it is impossible to stop the flow of all stray electric currents to and from equipment in constant contact with the electrolyte, since the electrolyte itself conducts such current, we have found that the equipment can be kept cathodic in relation to the electrolyte and that thereby electrolytic corrosion can be controlled.

This invention provides for protecting electrolyte circulation pumps and related metallic equipment against electrolytic corrosion by by-passing substantially all of the stray currents around the equipment, and then making sure that the equipment is kept cathodic with respect to the remaining stray current flowing in the electrolyte by establishing on the equipment an electric charge that is relatively more negative than the electrolyte in contact with it. In carrying out the method of the invention, the equipment preferably is insulated from ground and from all adjacent metallic structures. Substantially all of the stray electric currents flowing to and from the equipment, mostly through the electrolyte solution, are shunted around the equipment, and an electric charge is established upon the equipment which is negative in relation to the electrolyte solution in contact with it. This may be accomplished by connecting the equipment to a relatively negative point in the D. C. electrolytic circuit from which the stray currents emanate, and allowing a limited amount of electric current to flow to the equipment. In this way the equipment is maintained slightly cathodic.

Of course, it is generally undesirable to make the equipment too strongly cathodic, for then troublesome deposition of copper from the electrolyte on to the pump, or other objectionable cathode reactions, may occur. With currents of the magnitude of a few amperes (say one to two amperes or even somewhat more), copper deposition has been found to be either non-existent or negligible on pumps of the size and type used commercially in electrolytic copper refineries and yet a current of this magnitude is ample to keep even a large pump safely cathodic.

In the apparatus combination by which the method of the invention is carried out, the piece of equipment to be protected is electrically insulated from ground and from all adjacent metallic structures. Insulator pipes of electrically non-conducting material are connected in the supply (e. g. pump intake) and delivery (e. g. pump discharge) pipelines through which electrolyte flows to and from the pump or other equipment. A shunt connection connecting points on the supply (suction) and delivery (discharge) pipelines that lie adjacent to the ends of the insulator pipes farthest from the pump is provided to by-pass substantially all of the stray electrical currents around the pump (or other piece of equipment). An electrical connection is made between the equipment and a point in the electrolytic circuit which is negative with respect to the solution in the equipment, thus permitting an electric current to flow to the pump or other equipment through the electrolyte and continually maintaining such equipment slightly cathodic.

An advantageous embodiment of the invention for protecting a circulation pump in an electrolyte circulation system in an electrolytic copper refinery is shown in the single figure of the accompanying drawing.

Throughout the following description, for purposes of consistency, the flow of electric current (at all points outside the generator G) will be assumed to be from a more positively charged point or anode to a more negatively charged point or cathode.

In the apparatus shown in the accompanying drawing, an electrolyte solution circulation pump 5 withdraws solution from a solution well 6 through an intake (suction) pipeline 7 and circulates it through a discharge (delivery) pipeline 8 to an electrolyte solution heater 9. The electrolyte solution then passes through a supply pipeline 10 to an electrolytic tank 11. The electrolyte constantly overflows from the tank 11 into a launder 12 which carries it to a pipeline 13 by which it is returned to the solution well 6. Thus there is normally a continuous flow of the electrolyte through the electrolytic tank system.

An impure metallic copper anode 14, which is the material to be refined, is placed in the electrolytic tank and is connected through an appropriate bus bar system 15 to the positive terminal of a direct current generator G. A cathode starting sheet 16 of pure copper is also hung in the electrolytic tank and is connected through the bus bar system to the negative terminal of the generator. The anode is continuously dissolved in the electrolyte while electric current is flowing through the electrolytic circuit, and the copper ions thus introduced into the electrolyte are deposited upon the cathode. Impurities present in the anode are in part dissolved in the electrolyte (but not redeposited on the cathode) and in part fall to the bottom of the tank as a sludge. Although for the most part the electric current flows in the paths intended for it, some stray currents become diverted from their path between the electrodes and pass through the pipelines and the electrolyte solution to the various pieces of equipment in the electrolyte circulation system. Faulty insulation and grounding of pipelines and equipment sometimes allows these stray currents to become quite large. Whenever the direction of flow of the stray currents is such as to make the pump anodic to the electrolyte, it becomes subject to electrolytic corrosion. The metallic pipelines themselves are usually of lead, the solution well and electrolytic tank are lead-lined, and the solution heater tubes are of a graphite composition, so that these parts of the circulation system are not particularly subject to electrolytic corrosion; but the pump, which for mechanical reasons is best made of stainless steel, is easily subject thereto.

The pump 5 and a motor 17 to drive the pump are mounted upon a common cast iron base 18. This base in turn is mounted upon a grounded concrete pier 19 that has been covered with a sheet of lead 20 to protect it from acid drip. Thick strips of insulating material 21 are placed between the cast iron base 18 and the lead plate 20, and the stud bolts and nuts 18a which pass through the cast iron base to anchor it to the concrete pier are insulated by fiber tubes and washers from the base. In this way the iron base, and consequently the circulation pump 5 mounted thereon, is completely insulated electrically from the grounded concrete pier upon which it is mounted.

The frame of the motor 17 is solidly grounded through an electrical conductor 22, and is insulated from the circulation pump 5 by a block of electrically insulating material 23 in the coupling which joins the shafts of the motor and the pump. The motor is also insulated from the cast iron base 18 by electrically insulating washers placed between the legs of the motor frame at its base and under the heads of the bolts used to fasten the motor to the base, and by insulating sleeves surrounding those bolts. Thus the pump 5 is completely insulated from the grounded motor frame and the grounded concrete pier.

An indicator light bulb 24 of low wattage is advantageously electrically connected between the frame of the motor 17 and the pump 5. It remains lighted as long as the insulation between the pump 5 and ground remains intact, but goes out if, through electrical leakage, the pump becomes grounded. Any breakdown in the insulation between the pump and ground will result in an abnormal flow of current in a direction to make the pump highly anodic if it should happen to be located in a part of the electrolytic circuit where it normally is negative to ground; therefore it is important that means for prompt detection of insulation breakdown, such as the bulb 24, be provided.

The solution well 6 and the solution heater 9 are well insulated from ground by appropriate insulating means. In order to insulate the intake pipeline 7 and the pump 5 from the solution well, two sections of rubber lined insulator pipe 25 and 26 are connected in the intake pipeline between the pump and the solution well. The insulator pipe sections are each quite long (say about two feet in length), and their rubber lining covers the faces of their flanged ends so that the rubber abuts against the corresponding flanges on the ends of the pipe to which they are connected and prevents a direct metal-to-metal contact. Instead of using lengths of rubber lined metal pipe as the insulator pipes 25 and 26, lengths of non-metallic pipe made of such insulating materials as asbestos or hard rubber may be used. The insulator pipes should be spaced a considerable distance (say eight feet or more) from the pump, the farther away the better, and are spaced apart from one another by a distance of say about a foot.

In like manner a section of rubber lined (or equivalent) insulator pipe 27 is placed in the discharge pipeline 8 between the pump and the solution heater 9. This section of insulated pipe should also be of about the same length as the insulator pipe 26 in the delivery pipeline, and should likewise be placed a considerable distance from the circulation pump.

A relatively long section of rubber lined (or equivalent) insulator pipe 28 is advantageously placed in the pipeline 10 between the solution heater 9 and the electrolytic tank 11, to help control the flow of stray currents outside the electrolytic tank 11 through the metal of the pipelines.

By virtue of the above-mentioned sections of insulator pipe 26 and 27 and the insulation placed between the pump and its driving motor and concrete base, the pump is insulated as thoroughly as it can be from ground and from adjacent metallic equipment. As long as these insulation measures are intact and effective the only significant current flow to and from the pump that can take place will be that which occurs across the insulator pipes through the electrolyte solution. In this way most of the stray current that would ordinarily flow through the metal of the adjacent equipment and pipelines is blocked and only the relatively small amount of current that can flow through the electrolyte can use the pump metal as an anode, thus minimizing destructive electrolytic action on the pump. Should a heavy current flow from ground to the pump due to a breakdown in the insulation, the location of the insulator pipe sections 26 and 27 at a considerable distance from the pump will force the greater part of such breakdown current to flow from metal to electrolyte adjacent to the ends of the intake pipeline 7 and the discharge pipeline 8 which are farthest from the pump, thus causing such pipeline ends rather than the pump to act as anodes for most of the current. The intake and discharge pipelines 7 and 8 are made of lead, and so are not especially subject to anodic corrosion. Due to the insulator pipe sections, only a small part of the current can flow away from the pump through the electrolyte and use the pump metal as an anode, thus allowing ample time for detection and correction of the insulation breakdown before any considerable damage has been done to the pump.

A heavy copper cable 29 is electrically connected as a shunt from the intake pipeline 7 between the sections of insulator pipe 25 and 26 to the discharge pipeline 8 between the sections of insulator pipe 27 and 28. This shunt connection causes substantially all of the stray electric currents, flowing in the electrolyte solution circulation pipelines, particularly the current flowing in the metal of the pipelines, to be by-passed around the pump. As a result the pump, as long as the afore-described insulation remains intact, cannot become either strongly anodic or strongly cathodic.

The pump 5, having been thoroughly insulated and provision made to shunt most of the stray current around it, is also electrically connected through a resistance 30 to a point in the electrolytic tank circuit where the circuit is negative relative to the electrolyte flowing through the pump. The resistance 30 should be sufficient in view of the voltage across it to allow a small bias current (say about two amperes) to flow away from the pump metal. This bias current flows towards the pump metal through the electrolyte in the insulator pipes 26 and 27 and then mostly through the metallic intake and discharge pipelines 7 and 8. Usually the inflowing bias current is about divided in half, approximately one ampere flowing towards the pump through the electrolyte in the intake pipeline 7 and approximately one ampere flowing to the pump through the electrolyte in the discharge pipeline 8. A slight amount of bias current will also come in through the indicator bulb connection 24 if the pump is negative to ground.

The two amperes, more or less, of bias current flowing towards the circulation pump 5 through the electrolyte solution in the intake and discharge pipelines, after crossing the insulator pipes 26 and 27, will mostly enter the metal sections of such pipelines at a distance from the pump and will then pass through the metal of the pipelines to the pump and out through the resistance 30 to the electrolytic circuit. Only a small amount of the two amperes of bias current will flow through the electrolyte in parallel with the larger amount flowing through the metal of the intake and discharge pipelines. This small portion of the bias current that flows through the electrolyte is ample to make and keep the pump metal slightly cathodic and to provide excellent protection from electrolytic corrosion, without causing any noticeable amount of copper to be deposited on it. Some slight deposition of copper will occur on the lead pipe sections 7 and 8 adjacent to the insulator pipe sections 26 and 27. However, this deposit is not large, and is removed, about as fast as it is formed, by erosion and by re-solution as a result of the chemical oxidation.

One ampere of current flowing across each insulator 26 and 27 is just sufficient to keep the end portions of the lead pipe connected thereto on the far sides from the pump continuously coated with an anodic lead sulfate slime blanket which builds up a back voltage of some 1.75 volts (and causes liberation of oxygen which assists in chemically dissolving copper cathodically deposited on the opposite side of the insulator pipe when such deposit is formed downstream). With the addition of say another one-third of a volt due to the IR drop in the electrolyte in each insulator pipe, a voltmeter will show a reading of slightly more than two volts across each of the insulator pipes 26 and 27 when the proper bias current is flowing through them to the pump 5. As described above, these insulator pipes 26 and 27 also serve to prevent excessive currents from flowing away from the pump if its insulation breaks down to ground. Whenever a D. C. voltmeter connected across the insulator pipes 26 or 27 shows a much larger voltage reading, or a reverse reading of any value whatever, the condition causing such abnormal reading should be promptly sought out and corrected.

The other two insulator pipes 25 and 28 in the supply and delivery pipelines help limit the flow of abnormally heavy stray currents and also serve as shunts for determining with a D. C. voltmeter the value and direction of stray current flow. Twenty-five amperes of stray current flowing across a two-foot long insulator pipe eight inches in diameter will give a voltage reading of some nine volts, plus 1.75 volts of anodic back voltage, or a total of about eleven volts, with the pipelines filled with regular acid copper sulfate tank house electrolyte. This same amount of current flowing across an eight inch diameter insulator pipe four feet in length will give a voltage reading of eighteen volts, plus 1.75 volts of anodic back voltage, or about twenty volts. Normally, the voltage reading on a four foot long insulator does not exceed five volts, which means that a current of $$\frac{(5-1.75) \times 25}{18}$$

or 4.5 amperes is flowing. If this amount of stray current is flowing into the system through insulator pipe 28, the same current minus the two amperes of bias current should be found in the two foot long insulator 25 flowing in the same direction. The voltage reading across the insulator 25 would then be about $$\frac{(2.5 \times 9)}{25}$$

volts plus 1.75 volts, or a total of 2.65 volts.

The above-described system has been successfully demonstrated in an electrolytic copper refinery to provide excellent corrosion protection for a stainless steel horizontal centrifugal pump delivering approximately 1,000 cubic feet per minute of conventional acid copper sulfate electrolyte. Prior to installation of the protective system, routine checks of the inside of the pump had shown definite evidence of electrolytic corrosion of the pump metal after only a few months service. However, after installation of the above system no further evidence of electrolytic corrosion was detected.

We claim:

1. In an electrolytic operation in which an electrolyte solution is connected in a direct current circuit and in which said electrolyte is caused to flow through a circulation system, the method of preventing electrolytic corrosion by stray electric currents of equipment handling said electrolyte solution in the circulation system which comprises insulating said equipment from ground, insulating said equipment from adjacent metallic structures in the circulating system by insulators interposed in the conduits of the circulating system leading to and from said equipment, shunting around said equipment substantially all of the stray electric currents flowing toward and from it by a shunt connection connected to said conduits leading to and from said equipment at the sides of said insulators remote from the equipment, connecting said insulated equipment to said D. C. circuit at a point where said circuit is negative relative to the electrolyte in said equipment, limiting the magnitude of the electric current allowed to flow to said equipment through the electrolyte in contact therewith so that no more than the metallic constituent of the electrolyte is cathodically deposited out of the solution onto the inside of said equipment than can be chemically redissolved and washed away by the solution flow.

2. The method of claim 1 in which the magnitude of electric current allowed to flow to said equipment is limited to a few amperes.

3. The method of claim 1 in which electrical leakage between said equipment and ground is detected.

4. In an electrolytic operation in which a direct current is passed through an electrolyte solution, the method of preventing electrolytic corrosion by stray electric currents of equipment handling said solution which comprises insulating said equipment from ground, insulating said equipment from adjacent metallic structures in the circulating system by insulators interposed in the conduits of the circulating system leading to and from said equipment, shunting around said equipment substantially all of the stray electric currents flowing toward and from it through the electrolyte by a shunt connection connected to said conduits leading to and from said equipment at the sides of said insulators remote from the equipment, establishing upon said equipment an electric charge which is negative relative to the electrolyte solution in contact therewith, continually maintaining said equipment slightly electrically negative relative to said electrolyte, and limiting the magnitude of the electric charge established on said equipment so that no more of the metallic constituents of the electrolyte is cathodically deposited out of the solution onto the inside of said equipment than can be chemically redissolved by the solution.

5. The combination with metallic equipment for handling an electrolyte solution which is connected in a D. C. circuit, and with metallic conduits through which such electrolyte is delivered to and from said equipment, of means for preventing electrolytic corrosion of said equipment comprising means insulating said equipment from ground, electrically insulating lengths of conduit interposed in the conduits through which electrolyte is delivered to and from said equipment, whereby said equipment is electrically insulated from all adjacent metallic structures, an electrical shunt connecting together the metallic conduits on the sides of said insulating conduits that are remote from said equipment, thereby to by-pass around said equipment substantially all of the stray currents flowing to and from the equipment, an electrical connection between said equipment and a point in said circuit that is negative relative to the electrolyte in said equipment, whereby the equipment is maintained slightly cathodic, said connection including electrical resistance of such magnitude as to limit the electric current flowing to the equipment through the electrolyte solution to no more than a few amperes so that no more of the metallic constituents of the electrolyte will be cathodically deposited out of the solution onto the inside of the equipment than can be chemically redissolved by the solution, and means protecting the equipment from harmful anodic corrosion when the direction of current flow through the electrolyte solution in the equipment is temporarily reversed.

6. An apparatus as defined in claim 5 which includes means for automatically detecting electrical leakage between said equipment and ground.

7. The combination with a metallic circulation pump for handling an electrolyte solution which is connected in a D. C. circuit, and with metallic suction and delivery pipelines connected to said pump, of means for preventing electrolytic corrosion of said pump, comprising means insulating said pump from ground, an insulator pipe of electrically insulating material connected in each of the suction and delivery pipelines, an electrical shunt connection between the suction pipeline and the delivery pipeline on the sides of said insulator pipes that are remote from the pump, an electrical connection between the pump and point in said circuit that is negative relative to the electrolyte in the pump, whereby the pump is kept slightly cathodic, means limiting the magnitude of electric current flowing to the pump through the electrolyte to no more than a few amperes, and means protecting the equipment from harmful anodic corrosion when the direction of current flow through the electrolyte solution in the equipment is temporarily reversed.

8. The combination with a metallic circulation pump for handling an electrolyte solution which is connected in a D. C. circuit, and with metallic suction and delivery pipelines, of means for preventing electrolytic corrosion of said pump comprising an insulator pipe of electrically insulating material connected in each of said suction and delivery pipelines, an electrical shunt connection between the suction pipeline and the delivery pipeline on the sides of said insulator pipes that are remote from the pump, and an electrical biasing connection between the pump and a point in said circuit that is negative relative to the electrolyte in the pump, said biasing connection including an electrical resistor of sufficient magnitude to limit the electric current flowing to the pump through the electrolyte solution to no more than a few amperes, whereby no more of the metallic constituent of the electrolyte will be cathodically deposited out of the solution onto the inside of the pump than can be chemically redissolved by the solution.

9. The combination with an eletrolytic cell tank adapted to contain an electrolyte solution, anodes and cathodes connected in a D. C. circuit and immersed in electrolyte in said tank, and an electrolyte circulation system through which electrolyte is withdrawn from the cell tank and is returned thereto, said circulation system including a metallic pump and metallic suction and delivery pipelines connected thereto, of means for preventing electrolytic corrosion of said pump comprising an insulator pipe of electrically insulating material connected in each of said suction and delivery pipelines at substantial distances from said pump, a shunt electrically connecting points on the suction and delivery pipelines which are on the sides of said insulator pipes farthest from the pump, and an electrical connection between the pump and a point in said D. C. circuit that is negative relative to the electrolyte in the pump, said connection including an electrical resistance, whereby a limited flow of electric current to the pump through the electrolyte sufficient to maintain the pump slightly cathodic is continually maintained.

10. The combination with a metallic pump handling an electrolyte solution that is connected in a D. C. circuit, and with metallic suction and delivery pipelines communicating respectively with the pump intake and the pump discharge, of means for preventing electrolytic corrosion of said pump comprising a length of insulator pipe of electrically non-conducting material interposed in the suction pipeline and a similar insulator pipe interposed in the delivery pipeline, a shunt electrically connecting points on said suction and delivery pipelines that are located on the sides of the insulator pipes which are farthest from the pump, means establishing on said pump an electrical charge which is slightly negative relative to the electrolyte in the pump, whereby the pump is continually maintained slightly cathodic, and means limiting the magnitude of the electric charge established on the pump so that no more of the metallic constituent of the electrolyte will be cathodically deposited onto the inside of the pump than can be chemically redissolved by the solution.

References Cited in the file of this patent

UNITED STATES PATENTS

| | | |
|---|---|---|
| 476,914 | Bernard | June 14, 1892 |
| 1,365,141 | Adams | Jan. 11, 1921 |
| 1,671,173 | Von Wurstenberger | May 29, 1928 |
| 2,310,757 | Wagner | Feb. 9, 1943 |
| 2,359,239 | Newton | Sept. 26, 1944 |

FOREIGN PATENTS

| | | |
|---|---|---|
| 895,793 | France | Apr. 11, 1944 |